(12) United States Patent
Torriere (10) Patent No.: US 11,717,857 B2
(45) Date of Patent: *Aug. 8, 2023

(54) SYSTEM AND PROCESS FOR SORTING AND RECOVERY OF RECYCLABLE MATERIALS FROM MIXED WASTE

(71) Applicant: WM INTELLECTUAL PROPERTY HOLDINGS, L.L.C., Houston, TX (US)

(72) Inventor: Bob Torriere, Tyngsborough, MA (US)

(73) Assignee: WM INTELLECTUAL PROPERTY HOLDINGS, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,120

(22) Filed: Sep. 13, 2021

(65) Prior Publication Data

US 2021/0402439 A1    Dec. 30, 2021

Related U.S. Application Data

(63) Continuation of application No. 17/098,920, filed on Nov. 16, 2020, now Pat. No. 11,117,169, which is a continuation of application No. 16/697,648, filed on Nov. 27, 2019, now Pat. No. 10,835,927.

(60) Provisional application No. 62/772,982, filed on Nov. 29, 2018.

(51) Int. Cl.
| | | |
|---|---|---|
| B07B 9/00 | (2006.01) | |
| B03C 1/23 | (2006.01) | |
| B07C 5/342 | (2006.01) | |
| B07B 4/08 | (2006.01) | |

(52) U.S. Cl.
CPC ............... *B07B 9/00* (2013.01); *B03C 1/23* (2013.01); *B07C 5/342* (2013.01); *B07B 4/08* (2013.01)

(58) Field of Classification Search
CPC .. B07B 4/08; B07B 9/00; B07B 15/00; B07C 5/342; B07C 2501/0054; B03C 1/23; B03C 1/30; B03C 1/02
See application file for complete search history.

(56) References Cited

U.S. PATENT DOCUMENTS

| | | | |
|---|---|---|---|
| 3,848,813 | A | 11/1974 | Stanczyk et al. |
| 4,065,282 | A | 12/1977 | Morey |
| 4,460,131 | A | 7/1984 | Cerroni |
| 4,730,790 | A | 3/1988 | Williams |
| 4,874,134 | A | 10/1989 | Wiens |
| 5,101,977 | A | 4/1992 | Roman |
| 5,184,780 | A | 2/1993 | Wiens |
| 5,333,738 | A | 8/1994 | Fuchs et al. |
| 5,649,785 | A | 7/1997 | Djerf et al. |

(Continued)

FOREIGN PATENT DOCUMENTS

WO     2004/012866     2/2004

OTHER PUBLICATIONS

Couling, Tom; Recovering Recyclables Through Mized Waste Processing; Public Works 124.n2:p53; Hanley-Wood, Inc.; Feb. 1993; 3 pages.

(Continued)

*Primary Examiner* — Michael McCullough
*Assistant Examiner* — Kalyanavenkateshware Kumar
(74) *Attorney, Agent, or Firm* — Greenberg Traurig LLP (57) ABSTRACT

A system and process for sorting and recovery of recyclable materials, and in particular, sorting and recovery of recyclable materials from mixed waste comprising municipal solid waste in a materials recovery facility.

1 Claim, 4 Drawing Sheets

(56) References Cited

U.S. PATENT DOCUMENTS

| | | |
|---|---|---|
| 6,136,590 A | 10/2000 | Kruse |
| 6,250,472 B1 | 6/2001 | Grubbs et al. |
| 6,264,038 B1 | 7/2001 | Schmidt |
| 6,527,206 B1 | 3/2003 | Wuebbels et al. |
| 6,578,783 B2 | 6/2003 | Simon et al. |
| 6,974,097 B2 | 12/2005 | Simon et al. |
| 7,389,880 B2 | 6/2008 | Goldmann et al. |
| 7,503,513 B2 | 3/2009 | Simon et al. |
| 7,584,856 B2 | 9/2009 | Miller et al. |
| 7,810,646 B2 | 10/2010 | Miller et al. |
| 8,146,841 B2 | 4/2012 | Andela |
| 8,322,639 B2 | 12/2012 | Gitschel |
| 8,393,558 B2 | 3/2013 | Gitschel |
| 8,398,006 B2 | 3/2013 | Gitschel |
| 8,459,466 B2 | 6/2013 | Duffy et al. |
| 8,579,997 B2 | 11/2013 | Bai |
| 8,684,288 B2 | 4/2014 | Gitschel |
| 8,813,972 B1 | 8/2014 | Centers |
| 9,061,289 B2 | 6/2015 | Gitschel |
| 9,545,650 B2 | 1/2017 | Wang et al. |
| 9,649,666 B2 | 5/2017 | Gitschel |
| 9,713,812 B1 | 7/2017 | Gitschel |
| 9,884,324 B2 | 2/2018 | Gitschel |
| 10,835,927 B2 | 11/2020 | Torriere |
| 11,117,169 B2 | 9/2021 | Torriere |
| 2003/0183705 A1 | 10/2003 | Christiani et al. |
| 2005/0126958 A1 | 6/2005 | Bohlig et al. |
| 2005/0242006 A1 | 11/2005 | Bohlig et al. |
| 2006/0254957 A1 | 11/2006 | Bohlig et al. |
| 2008/0197058 A1 | 8/2008 | Kenny |
| 2009/0008298 A1 | 1/2009 | Studley |
| 2012/0199519 A1 | 8/2012 | Ward |
| 2012/0217328 A1 | 8/2012 | Bohlig et al. |
| 2015/0283551 A1 | 10/2015 | Gitschel |
| 2016/0339445 A1 | 11/2016 | Robinson |
| 2017/0226439 A1 | 8/2017 | Nguyen et al. |
| 2018/0037830 A1 | 2/2018 | Bohlig et al. |
| 2018/0229273 A1 | 8/2018 | Carvajo Lucena et al. |
| 2019/0217342 A1 | 7/2019 | Parr et al. |
| 2020/0129989 A1 | 4/2020 | Schultz |
| 2020/0171547 A1 | 6/2020 | Torriere |
| 2021/0060618 A1 | 3/2021 | Torriere |

OTHER PUBLICATIONS

Public Works; Refuse Processing and Resource Recovery; Public Works 125 n5: pE22; Hanley-Wood, Inc ; Apr. 15, 1994; 18 pages.

Schneider, Robert J. et al.; Multilevel MRF Solves Solid Waste Challenges; BioCycle 34.5: 62.J.; Press Inc.; May 1993; 4 pages.

FIG. 1

FIG. 2
(Continued from FIG. 1)

FIG. 3
(Continued from FIG. 2)

FIG. 4
(continued from FIG. 3)

SYSTEM AND PROCESS FOR SORTING AND RECOVERY OF RECYCLABLE MATERIALS FROM MIXED WASTE

RELATED APPLICATIONS

This application is a continuation application of, and claims the benefit of, U.S. application Ser. No. 17/098,920, filed Nov. 16, 2020, which claims the benefit, and priority benefit, of U.S. application Ser. No. 16/697,648, filed Nov. 27, 2019, now issued as U.S. Pat. No. 10,835,927, which claims the benefit, and priority benefit, of U.S. Provisional Patent Application Ser. No. 62/772,982, filed Nov. 29, 2018, the disclosure and contents of which are incorporated by reference herein in their entirety.

BACKGROUND

1. Field of Invention

This invention relates generally to sorting and recovery of recyclable materials from mixed solid waste in a materials recovery facility (MRF).

2. Description of the Related Art

It is known in the art that a materials recovery facility (MRF, pronounced "murf") can receive mixed waste comprising municipal solid waste (MSW) and separate recyclable materials from the mixed waste through a combination of manual and mechanical sorting. The sorted recyclable materials can undergo additional processing required to meet technical specifications for re-use, while the balance of the mixed waste can be sent to a disposal facility such as a landfill. However, prior systems and methods are inefficient, time-consuming and expensive.

Improvements to this technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a system and process for sorting and recovering materials from a mixed solid waste stream is provided. In certain aspects, the solid waste stream can be screened in a primary screener to remove all or substantially all materials having a size of 12" or larger or larger from the solid waste stream. The solid waste stream can be screened in a secondary screener to remove all or substantially all glass fines having a size of 2" or smaller from the solid waste stream. All or substantially all heavier weight materials can be removed from the solid waste stream. All or substantially all medium weight materials can be removed from the solid waste stream, wherein the medium weight materials comprise one or more of higher density plastics, ferrous/tin cans, and mixed paper, such that the solid waste stream substantially comprises lighter weight materials, wherein the lighter weight materials comprise one or more of newspaper sheets, lower density paper and plastic. The solid waste stream can be contacted with an air stream to remove all or substantially all lower density paper and plastic from the solid waste stream. The medium weight materials and the lighter weight materials can be recombined to produce a recombined solid waste stream. The recombined solid waste stream can be introduced into a mechanical separator to separate the recombined solid waste stream into fines materials, paper materials, and containers materials comprising bottles and cans. The containers materials can be passed under a magnet to remove all or substantially all ferrous metals. The containers materials can be passed through a plurality of eddy current separators to remove all or substantially all non-ferrous metals. The containers materials can be passed through a first optical sorter to remove all or substantially all polyethylene terephthalate (PET) materials. The containers materials can be passed through a second optical sorter to remove all or substantially all high-density polyethylene (HDPE) materials. The containers materials can be passed through a third optical sorter to remove all or substantially all polypropylene (PP) materials. In certain aspects, the materials in the solid waste stream are not shredded during the process. The solid waste stream can be fluffed to reduce the density of the solid waste stream prior to screening the solid waste stream in the primary screener. The recombined solid waste stream can be divided into a plurality of recombined solid waste streams, and wherein each of the plurality of recombined solid waste streams is introduced into a mechanical separator.

In certain illustrative embodiments, a system and process for sorting and recovering materials from a mixed solid waste stream is provided, wherein the process has a number of sequential steps. In certain aspects, in step (i), the solid waste stream can be screened in a primary screener to remove all or substantially all materials having a size of 12" or larger or larger from the solid waste stream. In step (ii), the solid waste stream can be screened in a secondary screener to remove all or substantially all glass fines having a size of 2" or smaller from the solid waste stream. In step (iii), all or substantially all heavier weight materials can be removed from the solid waste stream. In step (iv), all or substantially all medium weight materials can be removed from the solid waste stream, wherein the medium weight materials comprise one or more of higher density plastics, ferrous/tin cans, and mixed paper, such that the solid waste stream substantially comprises lighter weight materials, wherein the lighter weight materials comprise one or more of newspaper sheets, lower density paper and plastic. In step (v), the solid waste stream can be contacted with an air stream to remove all or substantially all lower density paper and plastic from the solid waste stream. In step (vi), the medium weight materials and the lighter weight materials can be recombined to produce a recombined solid waste stream. In step (vii), the recombined solid waste stream can be introduced into a mechanical separator to separate the recombined solid waste stream into fines materials, paper materials, and containers materials comprising bottles and cans. In step (viii), the containers materials can be passed under a magnet to remove all or substantially all ferrous metals. In step (ix), the containers materials can be passed through a plurality of eddy current separators to remove all or substantially all non-ferrous metals. In step (x), the containers materials can be passed through a first optical sorter to remove all or substantially all polyethylene terephthalate (PET) materials. In step (xi), the containers materials can be passed through a second optical sorter to remove all or substantially all high-density polyethylene (HDPE) materials. In step (xii), the containers materials can be passed through a third optical sorter to remove all or substantially all polypropylene (PP) materials.

In certain aspects, the process can further include the steps of: splitting the solid waste stream into a plurality of solid waste streams between step (i) and step (ii), treating the plurality of solid waste streams according to steps (ii)-(vii), combining the container materials resulting from step (vii) for each of the plurality of solid waste streams to form a single stream of combined container materials, and treating the single stream of combined container materials according to steps (vii)-(xii). In certain aspects, the materials in the solid waste stream are not shredded during the process.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to a system and process for sorting and recovery of recyclable materials, and in particular, sorting and recovery of recyclable materials from mixed waste comprising municipal solid waste in a materials recovery facility or "MRF." The subject matter is described more fully hereinafter with reference to the accompanying drawings in which embodiments of the system and process are shown. The system and process may, however, be embodied in many different forms and should not be construed as limited to the embodiments set forth herein; rather, these embodiments are provided so that this disclosure will be thorough and complete, and will fully convey the scope of the system and process to those skilled in the art.

As used herein, the term "municipal solid waste" or "MSW" means residential, commercial or industrial waste that includes, but is not limited to, one or more of the following materials: heavier weight materials (i.e., aggregates, glass, textiles, rubber, etc. . . . ), medium weight materials (i.e., fibers and rigid plastics), lighter weight materials (i.e., foam plastics and film plastics), PVC plastics, ferrous and non-ferrous metals, inert residues, organic materials (i.e., food waste) and very heavy and/or bulky materials. As used herein, the term "fibers" includes paper and/or cardboard and like materials, and the term "clean plastics" includes rigid plastics, foam plastics and film plastics and like materials.

In certain illustrative embodiments, the presently disclosed subject matter utilizes advanced technology and machinery which are integrated into a multi-step system and process that are designed to treat contaminated MSW streams to meet or exceed minimum material quality specifications while also reducing and minimizing headcount of sorter personnel. Because the mix of materials in MSW can be so varied and unpredictable, it is especially desirable to have a system and process that can effectively sort and recover desired materials from MSW streams having a variety of material compositions.

Figure 1:
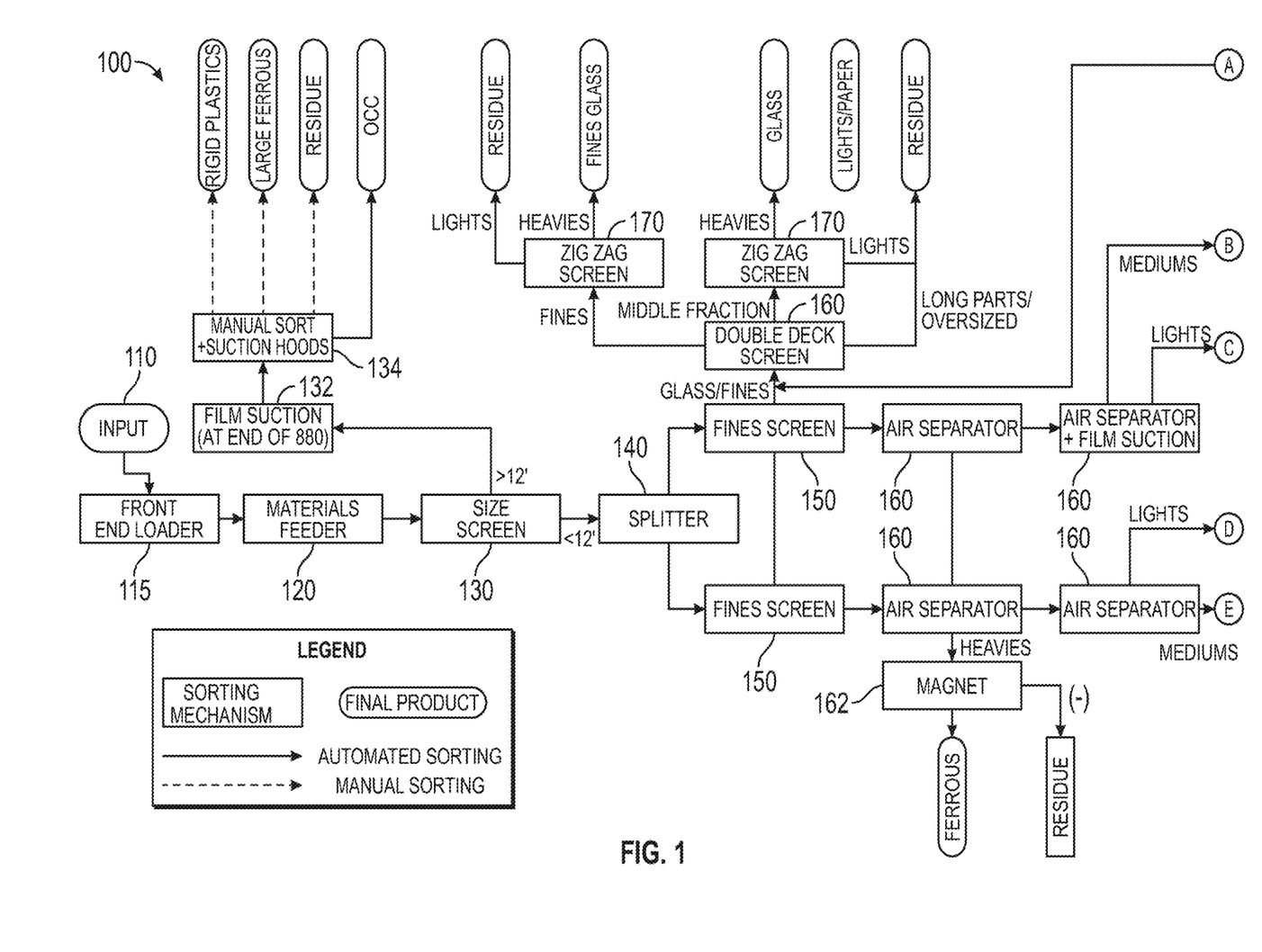
FIG. 1 is a process flow diagram for a single stream materials recovery facility in accordance with an illustrative embodiment of the presently disclosed subject matter.

An illustrative embodiment of a flow diagram for process 100 with related and associated system equipment is shown in FIGS. 1-4 herein, and includes the following stages:

Stage 1:

In certain illustrative embodiments, in-bound solid waste collection vehicles entering the process facility can discharge their municipal solid waste (MSW) onto an inbound tipping floor 110. Large bulky contaminant materials that are readily identifiable such as 2×4 lumber can be removed by hand or by a material handler such as an excavator or a front-end loader. The raw waste material on the tipping floor can also be fluffed by, for example, a front-end loader machine 115 to reduce the density. In the front-end loader 115, a loader bucket picks up the raw material and drops it to mix the raw material. The material can then be fed into a materials feeder 120. Equipment such as a Drumfeeder™ commercially available from Bollegraaf Recycling Solutions may be utilized for this purpose. The materials feeder 120 can have a large rotating drum with cleats that further breaks up clumps of compacted raw material and further fluffs the material into a lower density and transforms it into a metered, steady stream of liberated materials. These initial steps can allow the raw material to better separate before the materials stream progresses through the remaining stages in the process 100.

In certain illustrative embodiments, the materials feeder 120 can discharge the material onto a series of conveyers, such as a pit conveyor, and then an incline conveyor which transfers the material onto a weigh conveyor. The weigh conveyer can be fitted with belt scales or a 3D volumetric scanner to continuously weigh/monitor the material being processed. For example, the scanner can scan a cross-sectional view of the materials stream and measure or estimate the throughput in, e.g., tons per hour, to provide users with an estimate of the blend and density of materials passing through the process 100.

In certain illustrative embodiments, an OCC ("old corrugated cardboard") size screen 130 or a more robust C&D screen can be utilized to remove OCC and bulky items (such as rigid plastics and bulky metals) from the material stream. For example, the OCC (cardboard) size screen 130 can comprise elevated star screen removal machinery by which OCC having a designated size can be automatically removed from the material stream. In certain illustrative embodiments, materials having a size of 12-inch plus, can be removed. Equipment such as an AWS 880 which is commercially available from Van Dyk Recycling Solutions (manufacturer) can be utilized for this purpose. The screening deck of the size screen 130 can include various rotating axles, on which rubber stars are mounted. The stars can have a diameter of 880 mm, in certain illustrative embodiments, for purposes of removing material of 12" or larger. An example of a nominal size opening is about 12.3 inches per OCC screen, in certain illustrative embodiments.

In certain illustrative embodiments, the "overs" stream (that is, the removed materials such as clean cardboard) from size screen 130 can pass through a quality control (QC) station where film can also be manually or automatically extracted and placed into a film vacuum ductwork system 132 that discharges plastic film onto the contaminants conveyor for removal. Also, OCC QC inspectors can manually remove any contaminants 134, as well as mixed rigid plastics (e.g., plastic buckets) and bulky metals that go to a storage bunker, or otherwise the contaminants are then conveyed to a contaminants conveyor ending at a rejects compactor.

Stage 2:

In certain illustrative embodiments, the remaining raw material of 12-inch minus (after passing the OCC size screen 130) can be split into two parallel streams in a splitter 140 (or alternatively, remain in a single stream) and be conveyed to one or more fines screens 150 (also referred to as glass breaker screens) such as are available from CP Manufacturing. The fines screens 150 can have metal rotating discs that are designed to break the glass down to a smaller size, for example, 2 inch or smaller, prior to removal.

After falling through the fines screen 150, the glass can be conveyed to a glass processing area which uses a vibrating sizing screen 160 (for example a double deck screen) and light-heavy density material separation 170 (for example, one or more zig zag screens) to clean paper shreds and contaminants from the glass before storing the cleaned glass in concrete or steel bunkers.

Stage 3:

In certain illustrative embodiments, raw material (after glass removal) is conveyed to one or more series of successive air separators 160. The separators 160 can comprise WalAir™ separators which are commercially available from Van Dyk Recycling Solutions. The separators 160 can use air blowers and rotating drums to perform light-heavy density material separations to split the material into multiple streams having different densities.

For example, in certain illustrative embodiments, the higher density, bulky or "heavy" materials (such as dense electronics, small lumber such as wooden 2×4s, bowling balls, or masonry or other type bricks) can be separated out and conveyed to a belt magnet 162 to recover and separate ferrous metals from remainder residue that is sent down a contaminants conveyor to a compactor. The second fraction or "medium" materials is mostly containers (e.g., plastics, small ferrous/tin cans, and aluminum as well as UBC and mixed paper, and is sent to one or more rotating trommels 170. The overs fraction or "lighter" material (predominantly light/low density paper along with LDPE film, whole sheets of newspaper, and plastic) from the separators 160 is conveyed to an automatic film extraction hood and then one or more optical sorters 190 (for example, a Tomra Autosort Non-Paper W/Suction 2800 NIR1 High) which automatically perform a quality control of the paper and ejects contaminants (non-paper materials) by the use of optical scanning and compressed air.

For example, the optical sorters 190 can set or programmed to recognize brown cardboard vs. paper, in certain illustrative embodiments. Also, the optical sorters 190 can perform a split of light/heavy density paper from the paper stream, whereby airflow is set to select and remove one but not the other. The paper can be conveyed to a long, slow moving staging conveyor before being conveyed to the baler. The ejected contaminants can be combined with the containers stream headed to the rotating trommels 170. In certain illustrative embodiments, the optical sorters 190 can also use film suction 180 with compressed air and suction hoods/ductwork to extract the low-density plastic film (such as plastic grocery bags) which is discharged onto the contaminants conveyor headed to the compactor.

Stage 4:

In certain illustrative embodiments, the stream comprising primarily containers and mixed paper materials is then processed through the rotating trommels 170 that perform a sizing separation. In the illustrative embodiment of FIG. 2, two trommels 170 are utilized, and the sizing separation results in three streams/fractions from each trommel 170 (six in all—2×3). Separations of 2×4, 2×6 or other desired splits could also be utilized depending on the separation needs and available equipment of the user. Each of the streams/fractions of material from the trommels 170 can be conveyed to one or more ballistic separators 200 that perform three further separations: smaller glass/fines material (which is accumulated and then conveyed to the glass processing line); overs fractions of 2D material (mostly paper which is discharged onto optical sorters 210 (such as Tomra Autosort OCC/Containers 2800 NIR1 VIS High) that can perform an automated (i.e., with humans) quality control of the paper to eject contaminants, containers, and cardboard; and "backs" or 3D fraction of the ballistic separator 200 consisting of containers (bottles and cans) and contaminant rejects are gathered together and conveyed to the container processing line for further processing.

Figures 1, 2:
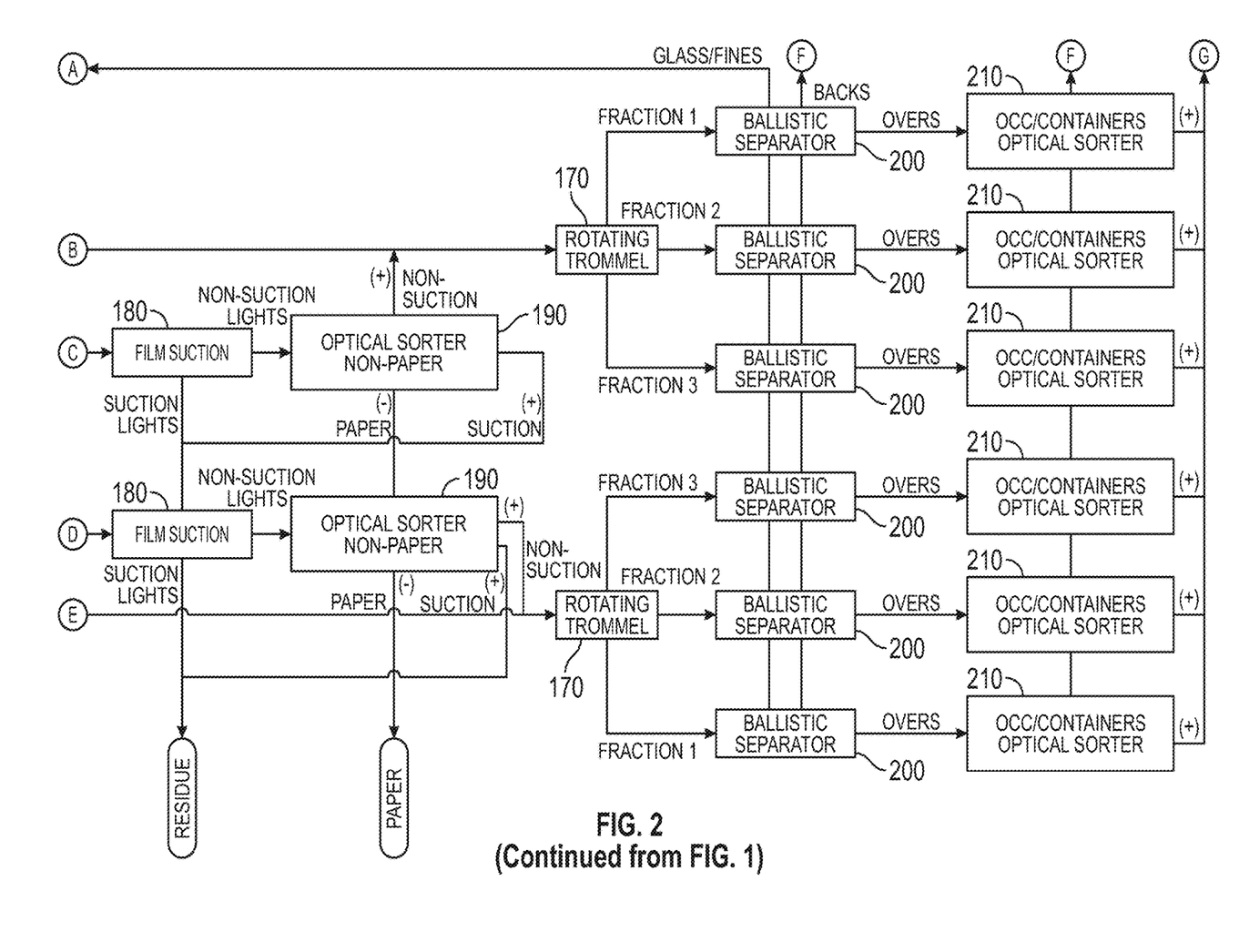
FIG. 2 is a continuation of the process flow diagram of FIG. 1, in accordance with an illustrative embodiment of the presently disclosed subject matter.
Figures 2, 3:
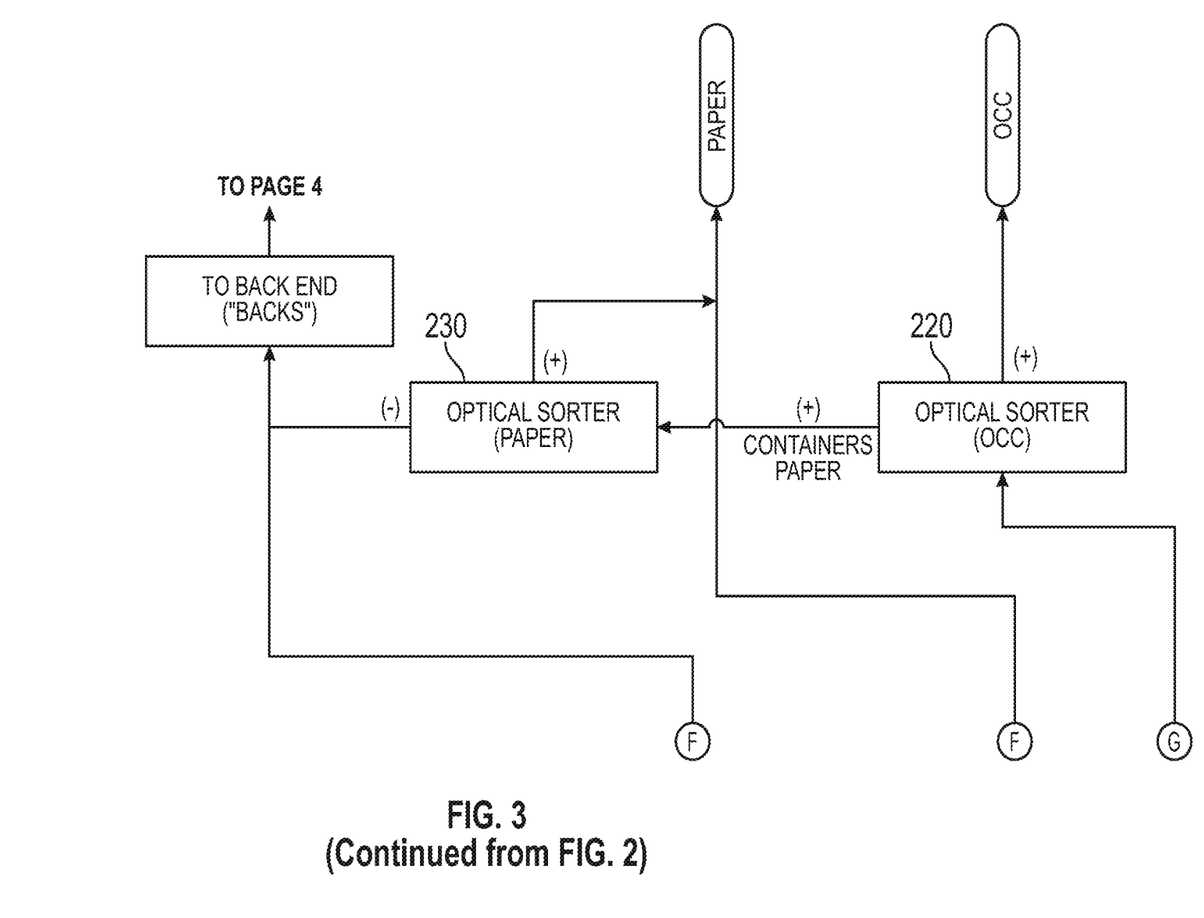
FIG. 3 is a continuation of the process flow diagram of FIG. 2, in accordance with an illustrative embodiment of the presently disclosed subject matter.

In the illustrative embodiment of FIG. 2 and FIG. 3, the streams of overs fractions of 2D material emerging from the optical sorters 210 are merged into a combined stream that is passed through a series of optical sorters 220, 230 (for example, a Tomra Autosort Paper 2000 NIR1 VIS High and a Tomra Autosort OCC 2800 NIR1 VIS High) to recover conveyed cardboard, which is delivered to meet with cardboard separated in Stage 3 above, and to recover conveyed paper, which is delivered to meet with 2D paper in Stage 4 above from ballistic separators 200, while the remaining stream is delivered to a back end of the system (see FIG. 4) for further processing.

Stage 5:

In certain illustrative embodiments, a magnet 240 (such as a rotating drum magnet) can be utilized to remove ferrous material that is then conveyed to a storage container.

Figures 3, 4:
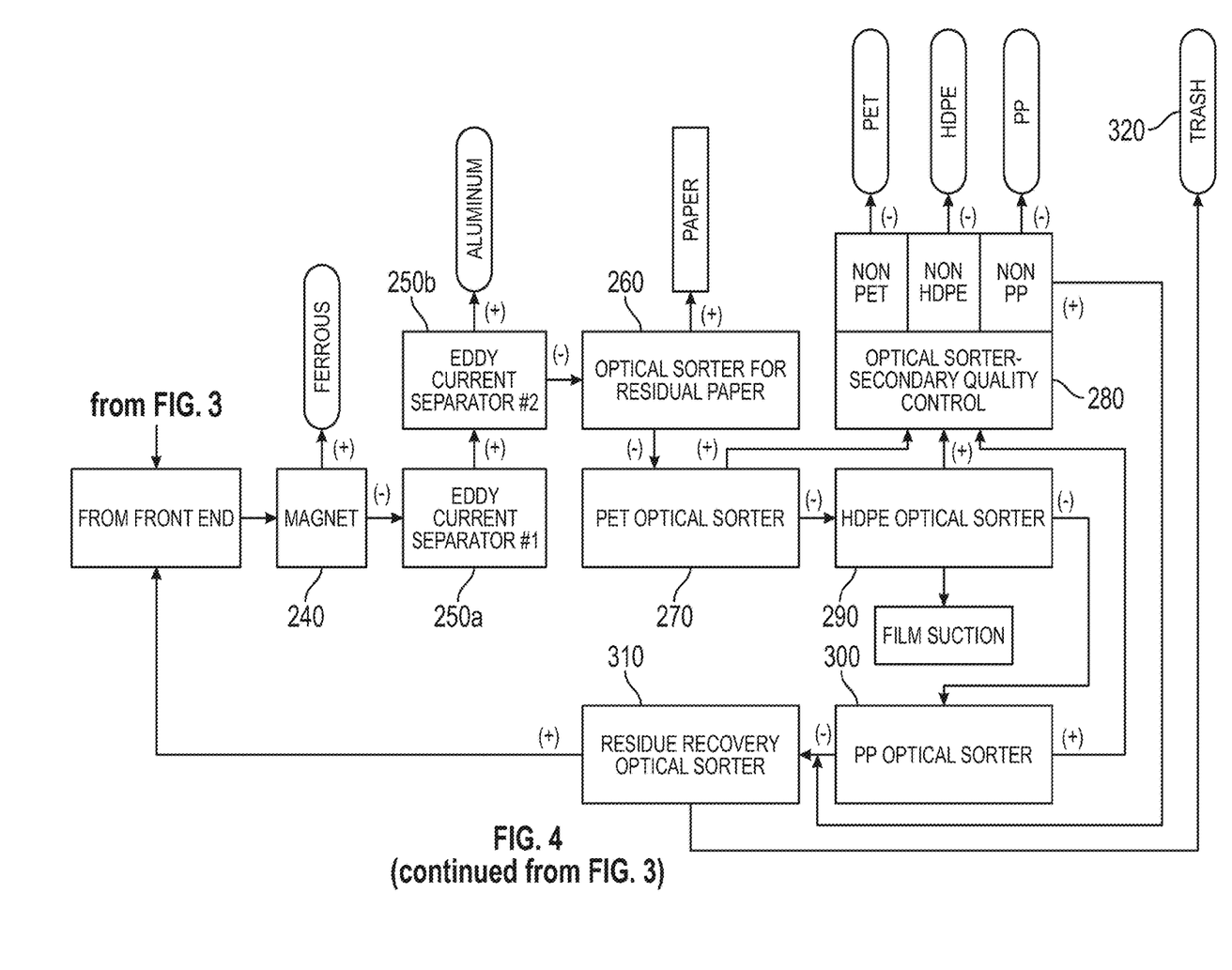
FIG. 4 is a continuation of the process flow diagram of FIG. 3, in accordance with an illustrative embodiment of the presently disclosed subject matter.

Stage 6:

In certain illustrative embodiments, the material that passes by the magnet 240 is sent to one or more eddy current separators 250 which use eddy current fields to eject non-ferrous metals material (mostly aluminum cans). For example, rare earth magnets can be utilized. In an illustrative embodiment where two in-line eddy current separators 250a and 250b are utilized, as shown in FIG. 4, the second separator 250b performs a quality control of the ejected stream from the first separator 250a, to provide additional "fine-tuning" before the non-ferrous metal is conveyed to a dedicated non-ferrous baler or can also be conveyed or pneumatically blown via ductwork to a storage container.

Stage 7:

In certain illustrative embodiments, the remainders from the eddy current separators 250 can be conveyed to an optical sorter 260 (such as a Tomra Autosort) designed to remove any residual paper from the material stream. The ejected paper can be conveyed to meet with the paper stream from the above Stage 4 from ballistic separators 200.

Stage 8:

In certain illustrative embodiments, the pass material from the above optical sorter 260 of Stage 7 can be conveyed to a PET optical sorter 270, such as a Tomra Autosort PET 2800 NIR1 High, which ejects PET (polyethylene terephthalate) plastics material such as polyesters, thermoformed sheets, strapping, and soft drink bottles. The PET material is run through a second quality control optical sorter 280 (such as a Tomra Autosort 3-Track 2800 NIR1 High) to remove any contaminants before being discharged in a slow-moving staging conveyor and then baled.

Pass material from the PET optical sorter 270 can be conveyed to an HDPE optical sorter 290, such as a Tomra Autosort HDPE 2000 NIR1 High, which ejects HDPE (high-density polyethylene) plastics material such as bottles, grocery bags, milk jugs, recycling bins, agricultural pipe, base cups, car stops, playground equipment, and plastic lumber. The HDPE material can also be run through the second quality control optical sorter 280 to remove any contaminants before being discharged in a staging conveyor and then baled.

Pass material from the HDPE optical sorter 290 can be conveyed to a PP optical sorter 300, such as a Tomra Autosort PP 2000 NIR1 High, which ejects PP (polypropylene plastics) material such as auto parts, industrial fibers, food containers, and dishware. The PP material can also be run through the second quality control optical sorter 280 to remove any contaminants before being discharged in a staging conveyor and then baled.

Thus, in certain illustrative embodiments, the process and system is specifically designed to identify and recover plastics #1 (PET), plastic #2 (HDPE), and plastic #5 (PP) according to recognized plastic recycling codes.

Pass material from the PP optical sorter 300 is mostly contaminants and/or reject material but before being sent to a compactor, the material can be conveyed to a residue recovery optical sorter 310 (such as a Tomra Autosort Recovery 2000 NIR1 VIS High) designed to eject out any residual recyclables to be discharged and conveyed back to the beginning stages of the system for another chance of being recovered.

Stage 9:

In certain illustrative embodiments, the remaining residue/rejects material can be removed from the site as "trash" 320 via compactor box, compactor trailer, or loose-load, while the various recovered materials or "commodities" can be prepared for shipment by either the use of baling, loose-loading, or via roll-off container.

The system and process described herein may include a plurality of sequential, non-sequential, or sequence independent steps or stages using, for example, the systems and equipment shown or described herein. Note that the process shown in FIGS. 1-4 is exemplary, and may be performed in different orders and/or sequences as dictated or permitted by the system and equipment described herein, and any alternative embodiments thereof, unless a particular ordering is otherwise specifically indicated in an embodiment set forth herein.

In addition, the processes described herein are not limited to the specific use of the system and equipment described herein but may be performed using any system and equipment that is capable of operating as described in connection with the processes shown in the figures. Numerous arrangements of the various stages, techniques, equipment and materials can be utilized. In addition, not all stages, techniques, equipment and materials described herein need be utilized in all embodiments.

It should be noted that certain particular arrangements of equipment and/or process steps for the system and process described herein are materially distinguishable from, and provide distinct advantages over, previously known technologies, as described in further detail herein. The system and process described herein also displays certain unexpected and surprising results.

For example, existing material recovery facilities typically utilize multiple human sorters to separate materials or provide a quality control check for the material streams. The number of human sorters in a typical MRF usually is related the material quality specification that the MRF is aiming to achieve as well as what automated technology is used, and is also related to the amount of material residue in the inbound material (i.e., how dirty is the incoming recycling stream). In certain illustrative embodiments, it has been found that the system and process described herein is expected to require a significantly reduced number of sorters, if any, in order to achieve the desired material quality specifications.

Also, in certain illustrative embodiments, the presently disclosed system and process uses two sequential eddy current separators to capture non-ferrous materials. Normally a sorter would be used for quality control of the aluminum output from only a single eddy current separator.

Also, existing MRFs typically utilize a "presort" station to sort out bulky metals, bulky plastics or rejects that could potentially harm the system equipment. By comparison, the presently disclosed system and process is designed so that no presort is needed, in certain illustrative embodiments, due to the use of an oversized initial size screen 130 (the 880 screen) and the use of the air separation units 160 to extract out the "heavies" materials.

In certain illustrative embodiments, the presently disclosed system and process utilizes optical sorters for quality control of paper from the ballistic separators 200, whereas typically paper is quality controlled by sorters.

In certain illustrative embodiments, the presently disclosed system and process can utilize multiple and sequential optical sorters 270, 280, 290, 300 to capture plastics such as PET, HDPE, and PP. For example, an initial optical sorter can be used to first eject the plastic product, and then the resulting stream can be conveyed to a second optical sorter which is used to perform the quality control that otherwise would occur at a manual sorter. See, e.g., FIG. 4.

In certain illustrative embodiments, the presently disclosed system and process does not utilize any shredders or otherwise shred the solid waste material stream. The commodities can be separated from the materials stream in their whole form (such as a whole plastic bottle or a whole sheet of newspaper), except for whole glass which is broken down to smaller pieces via the vibrating sizing screen 160 and the light-heavy density material separation 170, rather than to separate a commingled shredded stream of material.

In certain illustrative embodiments, the presently disclosed system and process can produce commodity materials at the following percent compositions and tonnages per hour without any shredding occurring, although the results will be variable depending on what type and composition of material stream is brought into the system and process from the customers:

TABLE 1

| Material | Percentage (%) | Tons Per Hour at 66 tph |
|---|---|---|
| OCC | 21.5 | 14.2 |
| ONP | 12.13 | 8.0 |
| MP | 33.63 | 22.2 |
| UBC | 0.75 | 0.5 |
| tin | 1.36 | 0.9 |
| PET | 2.11 | 1.4 |
| HDPE-Nat | 0.50 | 0.3 |
| HDPE-Pig | 0.68 | 0.4 |
| 1-7 Plastic | 0.36 | 0.2 |
| Scrap Steel | 0.68 | 0.4 |
| Glass | 17.33 | 11.4 |
| Residue (T&D) | 8.90 | 5.9 (may be much higher) |
| Totals | 100.0 | 66 |

It is to be understood that the described subject matter is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A process for sorting and recovering materials from a mixed solid waste stream, the process comprising:

screening the mixed solid waste stream in a plurality of screeners to produce a solid waste stream comprising heavier weight materials, medium weight materials and lighter weight materials;

passing the solid waste stream through a first air separator and removing the heavier weight materials from the solid waste stream;

passing the solid waste stream through a second air separator and removing the medium weight materials from the solid waste stream, wherein the medium weight materials comprise one or more of higher density plastics, ferrous/tin cans, and mixed paper, such that the solid waste stream substantially comprises lighter weight materials, wherein the lighter weight materials comprise contaminants and other materials;

passing the solid waste stream through a third air separator and contacting the solid waste stream with an air stream to isolate the contaminants from the other materials;

recombining the medium weight materials and the contaminants from the lighter weight materials to produce a recombined solid waste stream;

introducing the recombined solid waste stream into a mechanical separator and separating the recombined solid waste stream into containers materials comprising bottles and cans, and other materials;

passing the containers materials sequentially through a first eddy current separator and a second eddy current separator to remove all or substantially all non-ferrous metals; and passing the containers materials though one or more optical sorters to remove plastics materials.

\* \* \* \* \*